United States Patent Office 3,088,726
Patented May 7, 1963

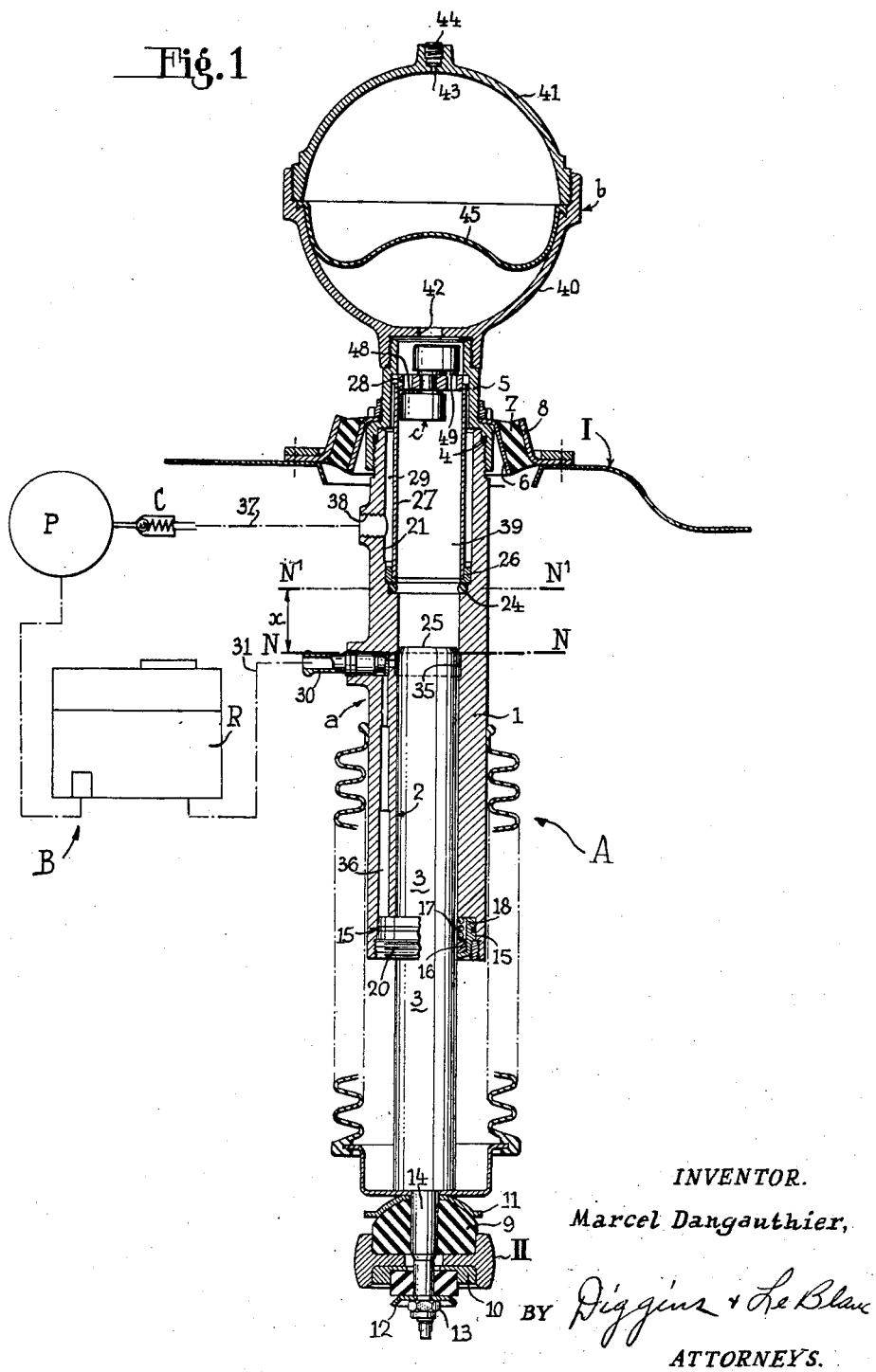

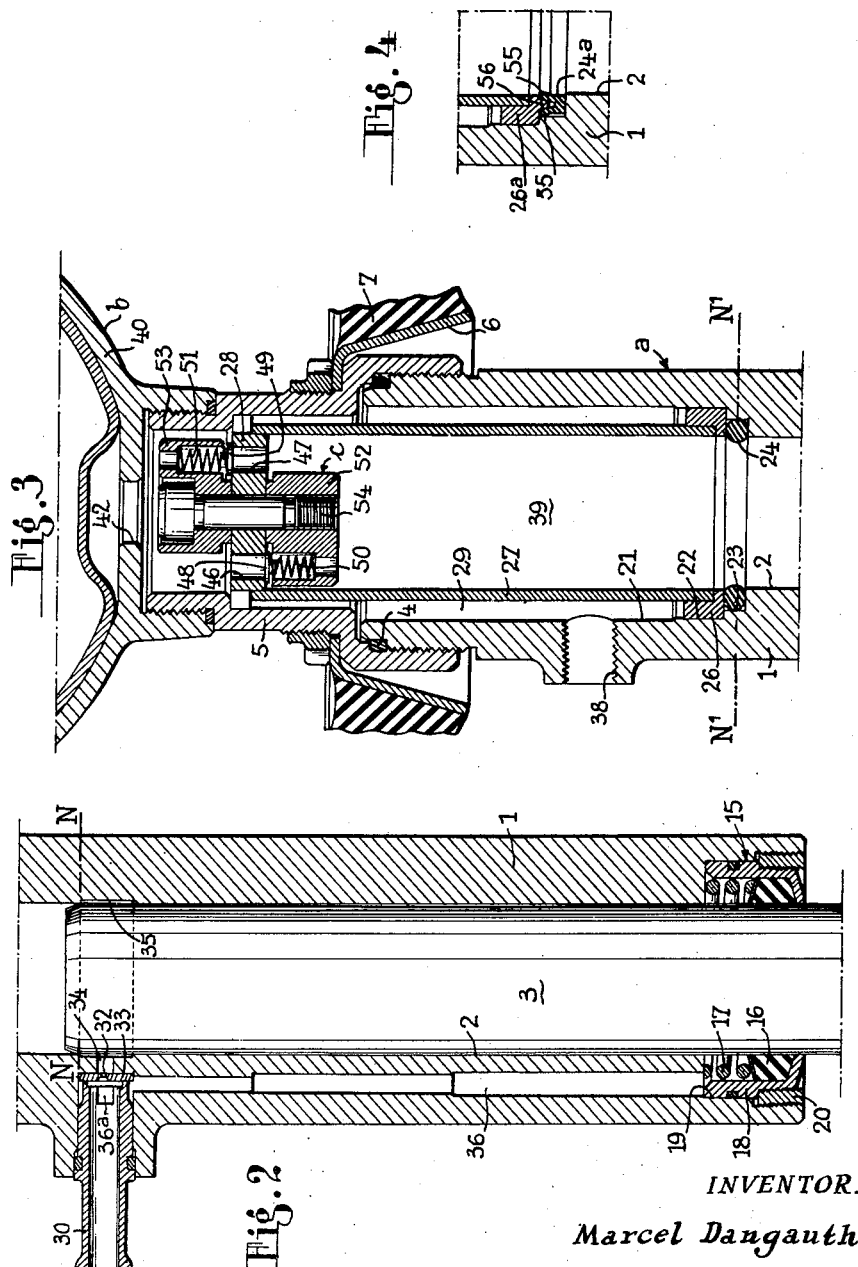

3,088,726
OLEO-PNEUMATIC CARRIER AND DAMPING DEVICE FOR A VEHICLE SUSPENSION SYSTEM
Marcel Dangauthier, Paris, France, assignor to Societe d'Etudes et d'Applications Industrielles Commerciales et Immobilieres Inter-Technique, Paris, France, a French body corporate
Filed Jan. 30, 1961, Ser. No. 85,605
Claims priority, application France Feb. 2, 1960
2 Claims. (Cl. 267—64)

The present invention relates to oleo-pneumatic carrier and damping devices adapted for suspension systems of motor and the like vehicles and comprising, mounted in series between the suspended and the unsuspended parts of the vehicle, a carrier and damping device of the cylinder and piston type, adapted to effectively carry a part of the suspended assembly of the vehicle and to damp the relative movements thereof with respect to the carrier unit, and a resilient device comprising a constant gas body enclosed in a sealed chamber of variable capacity and playing the part of the conventional suspension spring, the carrier device being continuously supplied with oil by means of a pump, drawing from a low-pressure tank, the cylinder of this device having formed therein an oil-input hole and a discharge port connected with said tank and cooperating with the piston for a level stabilization of the suspended part of the vehicle.

In the previously proposed embodiments, the piston is connected with the unsuspended part of the vehicle by means of a piston rod of a smaller cross-section than the piston, whereby an annular chamber is formed in the cylinder around the piston rod, between the piston and a seal surrounding this rod. The purpose of this chamber is to collect the oil leaking past the piston. This chamber has to afford some means for varying the volume thereof or else the device may jam. Various proposals have already been made for preventing such jamming.

The invention aims at solving this problem in the simplest possible way by omitting from the system the annular chamber altogether.

Accordingly, its object is to provide an oleo-pneumatic carrier and damping device for a suspension system, essentially characterized in that the piston is comprised by a constant-section cylindrical plunger slidably mounted in the cylindrical bore of the cylinder body and in a seal carried on the end of the cylinder body, and behind the internal face of which extends a discharge duct communicating with the discharge port provided in the cylinder, this duct allowing the exhaust of the oil leaking between the cylinder and the plunger-piston while providing, through said discharge port, a continuous flow of oil in the pump-cylinder-tank system.

This extremely simple arrangement thus eliminates any annular chamber and consequently any requirement for volumetric variation in such chamber.

According to a further feature, the cylinder has provided therein, above the discharge port and at a distance therefrom at least equal but close to the normal maximum shift of the piston in the cylinder during operation when the vehicle is travelling over a normal road, an auxiliary sealing member so that upon the engagement, at rest, of the plunger-piston into said sealing member, a perfect seal is established between the cylinder and the piston precluding any additional collapse of the suspension system.

A further object of the invention is the provision of a suspension system provided with at least one such improved oleo-pneumatic device.

Further features of the invention will become apparent from the ensuing description, when read in connection with the accompanying drawings given merely by way of an example and in which:

FIG. 1 is a sectional elevation of an improved oleo-pneumatic carrier and damping device according to the invention, and in this figure the oil-supply unit of the device is only very diagrammatically outlined;

FIGS. 2 and 3 are part-sectional elevations on a larger scale of the lower and upper portions of the carrier and damping device, respectively; and FIG. 4 is a part-sectional view of a modification of the fixed seal located interiorly in the cylinder body.

In the illustrative embodiment given by way of example, the invention is applied to a suspension adapted to interconnect the suspended rear part I of the vehicle, diagrammatically identified by a small portion of the vehicle body, and the carrier and driver rear body, which is, in turn, diagrammatically illustrated by one II of the two members of connection with the wheels (not shown) of this rear body.

The suspended part I is connected with each of the members II by the improved carrier and damping oleo-pneumatic device A, having oil fed thereto from a hydraulic unit B which is preferably common for the two carrier and damping devices A associated with the two wheels, and which comprises essentially a pump P drawing from a tank R and discharging through a non-return valve C.

The carrier and damping device comprises a carrier unit $a$ having a cylinder and a piston and adapted to effectively carry the suspended part of the vehicle, a pneumatic accumulator $b$ playing the part of the spring, and a damping device $c$.

The carrier unit $a$ comprises a cylinder body 1 in the cylindrical bore 2 of which is slideably mounted a plunger piston 3 whose diameter is equal with a very slight clearance to that of said bore.

The cylinder body 1 is threaded, at the upper end thereof and so as to clamp an annular seal 4, into a relieved member 5. This member has outerly inset thereon a frustoconical member 6 having the body 1 resiliently bearing thereon through an annular gasket 7 of adherized rubber or like material and a frustoconical flange 8 secured to this body 1.

As to the plunger piston 3, it is secured to the part II (axle or the like) integral with the respective wheel; the securement is effected e.g. by means of two rubber washers 9 and 10 (FIG. 1) clamped between said part II and metal washers 11 and 12 by means of a nut 13 screwed on the threaded end of an extension 14 of the piston extending with clearance through the part II.

The plunger piston 3 extends into the cylindrical bore 2 of body 1 through a seal 15 adapted to work without pressure. This seal comprises a multi-lipped seal 16 (FIG. 2) biased by a spring 17 against a cap 18 inserted in a counter-bore 19 of the cylinder body 1 and maintained therein by screw-threaded ring 20.

In the upper part of the cylinder body 1 is provided a stepped counter-bore 21, 22, 23. The part 23 has housed therein an elastic annular sealing member 24, the inside diameter of which being such that the plunger-piston is able to travel therethrough while providing a fluid-tight seal between this sealing member and a cylindrical end portion of the plunger-piston. This sealing member may be, for example, of the well-known O-ring type, whose purpose is to provide when the vehicle is stationary a complete seal between the upper end of the piston 3 and the cylinder, the height of said O-ring being such that during the travel of the vehicle the upper end 25 of the piston is barely disengaged from the joint to permit the maximum normal shift of the suspension system. The seal is located by a washer 26 housed in part 22 of the counter-bore and fixedly positioned therein by a cylindrical bush 27 coaxial with the cylinder 1 and of an internal diameter at least equal to that of the bore 2. This bush 27 is axially located by being clamped, upon the screwing down of the cylinder body 1 into the member 5, between the ring 26 and a disc 28 forming the supporting member for the damping device c. Through the notches afforded in the periphery of the disc 28, the annular gap 29 provided between the counter-bore 21 and the bush 27 extends into the body 1 below the damping device c.

The cylinder 1 is connected with a hydraulic unit B as follows:

It is connected to the tank R by a discharge coupling 30 and a tubular pipe 31; this coupling 30 extends: on the one hand, through a calibrated discharge port 32 (FIG. 2) provided in a diaphragm 33 and followed by a larger-section port 34, into a circular groove 35, the upper edge of which is at a given level N—N, therebelow and at a distance $x$ from the sealing plane of contact $N^1$—$N^1$ of the seal 24 with the plunger 3, which distance is close to but higher than the maximum normal shift of the piston 3 in the bore 2 during normal travel of the vehicle; and, on the other hand, at the base of the cylinder, into the volumetrically small annular gap provided in the ring 18 on the internal face of the seal 16, through at least one longitudinal duct 36 permanently communicating through at least one slot $36^a$ with the discharge pipe 30.

Moreover, the cylinder body 1 is connected with the discharge end of pump P, through a non-return valve C, by means of a duct 37 extending into the annular gap 29 through an inlet port 38.

Above the piston extending both into the bore 2 of body 1 and into the bush 27, the piston affords a carrier chamber 39. This chamber communicates through the damping device c with the gas-pressure accumulator b acting as a suspension spring.

This accumulator b comprises a tank formed in two parts 40 and 41 insettably secured on the relieved member 5 having formed therein at least one opening 42 communicating with the inside of this member 5 and accordingly with the inside of the cylinder 1, while the other part 41 is provided with a gas-filling orifice 43, a plug 44 being adapted to close this orifice after the filling. This accumulator is divided by means of a flexible membrane 45 of rubber or a like material, into two chambers, the upper of which contains a constant body of gas under pressure, while the lowest, which communicates with the cylinder body, is filled with oil. The accumulator has a volume such that an amount of oil remains permanently beneath the membrane level, irrespective of the conditions of operation.

Finally, the damping device c comprises (FIG. 2) the aforesaid disc 28 having (FIGS. 1 and 3) two sets of intercommunication orifices 46 and 47 drilled therein, each set including at least one and preferably several orifices; each orifice has bearing thereon, in reverse directions from one set to the other, a flap valve 48 or 49 biased on the seat thereof by a spring 50 or 51 bearing on a member 52 or 53. Both members are fixed by a screw 54 on the disc 28.

OPERATION OF THE SUSPENSION

We will describe in succession: the pressurization, the adjustment of the level of the suspended portion of the vehicle and the position of the device A when the pump P is inoperative.

(a) Pressurization

Oil pressure discharged from the pump P flows through the pipe 37 to the inlet orifice 38 and arrives into the chamber 39 of the cylinder, lifting on its way one or several valves 48 of the damping device c; it tends to drive the piston 3 downwards.

The pressure builds up in the chamber 39 and, upon reaching the value of the gas pressure within the accumulator b, the membrane 45 is lifted and this accumulator is part-filled with oil.

Upon the pressure at 39 and beneath the membrane 45 corresponding with the load of the vehicle, piston 3 tends to move out from the bore 2 and the suspended part I of the vehicle is lifted.

(b) Level Regulation

With the piston 3 continuing to move out from the bore 2, this piston uncovers, for a given position, which is that shown in FIGS. 1 and 2, the groove 35 which communicates with exhaust by the orifice 32 and the oil pressure then escapes towards the tank R.

The plane N—N of the upper edge of the groove 35 thus defines a given level of the suspended part I of the vehicle irrespective of the actual load.

Thus, should the vehicle be unloaded, the suspended portion is lifted and the communication towards the tank R is uncovered by the piston 3. The pressure drops and the vehicle is lowered to its normal position wherein the base of the level of the piston 3 is accurately located in said plane N—N passing by the upper edge of the groove.

The diaphragm 33 having the calibrated port 32 drilled therethrough, interposed between the groove 35 and the discharge coupling 30, prohibits in the course of the normal shift of the suspension system the occurrence of a too great oil flow towards the tank R. This diaphragm 33 together with the valve 48 thus provides a damping of the level regulation, preventing any possible tendency to hunting.

Subsidiarily, the oil-return line 31 (FIG. 1) also receives the possible leakages which may occur between the piston 3 and the bore 2. Thus, these small amounts of oil flow upwardly through the pipe 36 drilled through the wall of the cylinder body 1, and flow through the slot $36^a$ into the discharge channel formed by the coupling 30.

(c) Position With a Vehicle Stationary

The above-described level regulation is operative as long as the pump P continues to discharge, that is to say as long as the vehicle engine is working, in the case of the pump being directly driven by the propelling engine.

Upon the oil flow being discontinued and owing to small oil leaks occurring between the wall of bore 2 and the piston 3, the vehicle is lowered which means that that piston 3 moves inwards in the cylinder body 1.

These leaks are very small and the vehicle is lowered very slowly.

However, the additional O-ring 24, which is arranged in the bore 2 at a small distance $x$ above the normal position of the piston end, limits the lowering of the vehicle. Thus, with the end of the cylindrical portion of the piston reaching the level of the plane $N^1$—$N^1$ (FIGS. 1 and 3), the seal becomes complete and the leakage is absolutely non-existent. Since, on the other hand, the non-return valve C prevents any leakage towards the discharge port of the pump, the suspended part I of the stationary vehicle assumes a position which, while being slightly lower than that assumed thereby with the engine rotating, remains nevertheless much higher than it would be the case in the absence of the O-ring 24 at the time of the piston 3 being returned into the cylindrical bore 2, which latter position would be only limited by stops provided for the purpose on the vehicle.

Due to the distance $x$ (a few centimeters) during the travel of the suspension, any friction between the piston 3 and the ring 24 can occur only very rarely. Thus any undue wear of this ring is prevented and a total and lasting seal is achieved.

In FIG. 4 is shown an alternative embodiment of the auxiliary seal $24^a$. This is of the self-clamping two-lipped type, said lips, 55, being located on either side of a rib 56 formed on the supporting ring $26^a$.

It is to be understood that the invention is in no way restricted to the illustrated and described embodiments, which have been chosen merely by way of examples, and various changes of detail can be made therein without falling outside the scope of the appended claims.

Having now described my invention what I claim as new and desire to secure by Letters Patent is:

1. In a pneumatic vehicle suspension system having a hydraulic damping and level-regulating device, a cylinder having an open end and an opposite end, a plunger-piston penetrating said open end and tightly reciprocating in said cylinder, connecting means for connecting one of those two elements to the suspended part and the other to the unsuspended part of the vehicle, said plunger-piston and said opposite end of cylinder defining a variable chamber having a variable capacity, a pneumatic chamber communicating with said variable chamber, a source of liquid under pressure permanently communicating with said variable chamber, a low-pressure liquid reservoir, conduit means connecting said reservoir with a discharge orifice formed in the wall of said cylinder in the path of said plunger-piston in the cylinder, whereby said discharge orifice constitutes a level-regulating orifice, and an elastic annular sealing member arranged in the cylinder beyond said discharge orifice, with respect to the direction of the inward stroke of said plunger-piston into said cylinder, the inside diameter of said sealing member being such that said plunger-piston is able to travel therethrough while providing a fluid-tight seal between said sealing member and a cylindrical end portion of said plunger-piston whereby the inward course of said plunger-piston is tightly limited in the periods during which said source of liquid under pressure is inoperative.

2. In a pneumatic vehicle suspension system having a hydraulic damping and level-regulating device, a cylinder having an open end and an opposite end, a plunger-piston penetrating said open end and tightly reciprocating in said cylinder, connecting means for connecting one of those two elements to the suspended part and the other to the unsuspended part of the vehicle, said plunger-piston and said opposite end of cylinder defining a variable chamber having a variable capacity, a pneumatic chamber communicating with said variable chamber, a source of liquid under pressure permanently communicating with said variable chamber, a low-pressure liquid reservoir, conduit means connecting said reservoir with a discharge orifice formed in the wall of said cylinder in the path of said plunger-piston in the cylinder, whereby said discharge orifice constitutes a level-regulating orifice, and an elastic annular sealing member arranged in the cylinder beyond said discharge orifice, with respect to the direction of the inward stroke of said plunger-piston into said cylinder, the inside diameter of said sealing member being such that said plunger-piston is able to travel therethrough while providing a fluid-tight seal between said sealing member and a cylindrical end portion of said plunger-piston, whereby the inward course of said plunger-piston is tightly limited in the periods during which said source of liquid under pressure is inoperative; said hydraulic damping and level-regulating device further comprising a cylindrical bush, having the same inner diameter as the bore of said cylinder which receives the plunger-piston, said bush being housed in a counter bore of the cylinder whereby an annular chamber is defined between said bush and said cylinder, communication means connecting said annular space with said source and with the pneumatic chamber, damping means interposed between the inner chamber of said bush and said pneumatic chamber, and a ring interposed between said bush and the wall of said counter bore to hold said bush in position, the annular sealing member being secured between said bush and the wall of said counter bore.

References Cited in the file of this patent
UNITED STATES PATENTS

| | | |
|---|---|---|
| 1,831,136 | Reed | Nov. 10, 1931 |
| 1,861,821 | Schaum | June 7, 1932 |
| 2,756,046 | Lucien | July 24, 1956 |
| 2,982,538 | Bourcier De Carbon | May 2, 1961 |